May 7, 1929.
E. HUTCHENS
1,711,500
DRIVE UNIT
Filed Nov. 8, 1924
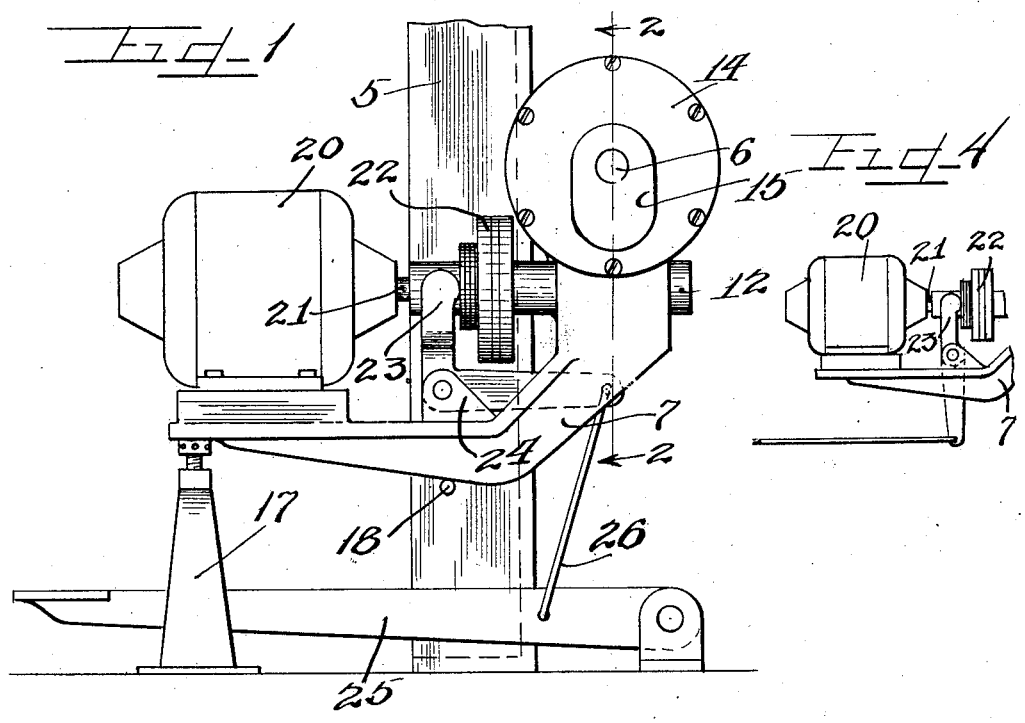
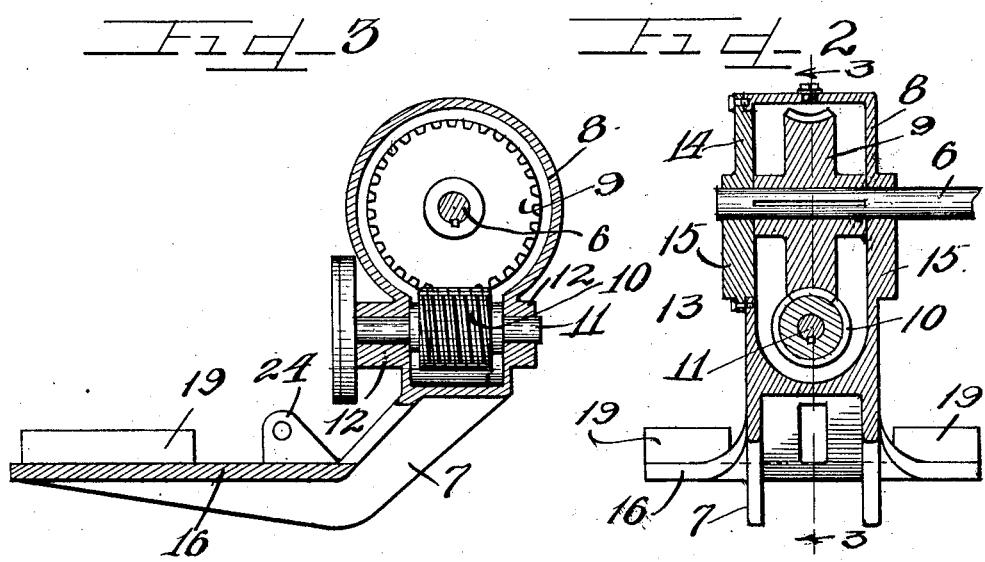

Patented May 7, 1929.  1,711,500

UNITED STATES PATENT OFFICE.

EDWARD HUTCHENS, OF MILWAUKEE, WISCONSIN.

DRIVE UNIT.

Application filed November 8, 1924. Serial No. 748,513.

This invention relates to a driving unit intended for application to a wide variety of power driven machinery.

It is an object of this invention to provide an interchangeable driving unit involving a change speed gearing wherein the gearing may be mounted directly upon the shaft to be driven and the whole unit supported from the shaft with the assistance of an external steady rest therefor.

It is also an object of this invention to provide a unit driving mechanism embodying a gear assembly wherein different speed changes may be obtained without affecting the balance of the unit by varying the position of the axis of the driven shaft relative to the driving unit to accommodate the different center distances required.

It is a further object of this invention to provide a unitary mounting member adapted to standardize the mountings of a series of prime movers and another series of gearings whereby the mounting member may be applied to a wide variety of machines having varying power and speed requirements. The advantages of such a standardized power unit embrace a large reduction in the cost of the power units to be applied to different machines and also a reduction in the cost of the machines themselves inasmuch as the entire power unit is applied to a stub shaft on the machines, no other provision therefor being necessary. For example, belt driven pulleys on existing machines may be replaced by the device of this invention without the necessity of any other alterations.

Other and further important objects of this invention will be apparent from the disclosures in the specification and drawings.

The invention (in a preferred form) is illustrated in the drawings and hereinafter more fully described.

On the drawings:

Figure 1 is an elevation of a device embodying the features of this invention.

Figure 2 is a section on the line 2—2 of Figure 1 with the motor and clutch omitted.

Figure 3 is a section on the line 3—3 of Figure 2.

Figure 4 is an elevation of a slightly modified form.

As shown on the drawings:

To illustrate the use of the device of this invention a machine column 5 is indicated in the drawings together with the end of a stub shaft 6 which is to be driven by the device to operate the machine. No particular type of machine has been indicated for the reason that the device is equally applicable to a wide variety of machinery especially of the type wherein an operator is usually in attendance to control the action of the machine.

A supporting bracket 7 includes a gear housing 8 within which is mounted a worm or spiral gear 9 and worm 10 of a ratio to give the desired speed ratio. The worm shaft 11 is journalled in suitable oblong bosses 12 in the housing and the gear is apertured at 13 to be keyed to a driven shaft 6 of the machine. A removable cover 14 is provided for the housing 8 and both the housing and the cover are provided with elongated bosses 15 which are drilled to receive the shaft 6 at the proper center distance from the worm to accommodate the desired worm gear diameter, which may vary in different applications due to different speed requirements.

The bracket 7 hangs supported from the shaft 6 as a pivot, and a horizontal extension 16 of the bracket may be adjustably supported in a manner such for example as the jack 17, or may rest on a pin 18 inserted in the machine column 5. It will be evident that this arrangement may be modified by swinging the bracket about the shaft 6 into other positions if the exigencies of the installation so require.

The extension 16 is provided with an upstanding boss 19 of a proper height to receive the smallest motor 20 that it may be desirable to use and align the shaft 21 thereof with the worm shaft 11. To use larger motors with this bracket it is only necessary to cut down the boss 19 to the proper height to align the motor shaft with the worm shaft. The motor and worm shafts are connected at will by means of a suitable clutch or flexible coupling 22 operated by a bell crank 23 or straight lever as shown in Figure 4 pivoted in a lug 24 on the bracket and actuated by means of the foot lever 25 and tie rod 26. A hand lever may, of course, be substituted for the foot lever. The clutch permits a delicate control of the driven machinery and is therefore a highly advantageous element in assuring proper functioning of the driven machinery.

The clutch is used as such when the driven machine is an intermittently operated one. For use with a continuously operating machine the clutch parts become a flexible coupling and the operating lever may be omitted.

I am aware that numerous details of construction may be varied through a wide range without departing from the principles of this invention, and I therefore do not purpose limiting the patent granted otherwise than necessitated by the prior art.

I claim as my invention:

1. In combination a shaft to be driven, a power unit, comprising a bracket including vertical and horizontal legs, said vertical leg having bearings to receive said shaft to be driven, said bracket being pivotally underslung from said shaft through the connection of the vertical leg to said shaft, a prime mover carried by the horizontal leg, a shaft driven thereby, gearing between said latter shaft and said driven shaft, and independent means arranged for cooperation with the underside of the horizontal leg for limiting the downward movement of said horizontal leg about the axis of said driven shaft, said latter means being adjustable so as to permit of said unit being mounted and held in positions at various distances from the floor depending upon the position of the driven shaft.

2. In combination a shaft to be driven, a power unit, comprising a bracket including vertical and horizontal legs, said vertical leg having bearings to receive said shaft to be driven, said bracket being pivotally underslung from said shaft through the connection of the vertical leg to said shaft, a prime mover carried by the horizontal leg, a shaft driven thereby, gearing between said latter shaft and said driven shaft, and a treadle pivotally connected to said bracket for controlling the operation of said driven shaft by said prime mover, and independent means arranged for cooperation with the underside of the horizontal leg for limiting the downward movement of said horizontal leg about the axis of said driven shaft.

In testimony whereof I have hereunto subscribed my name.

EDWARD HUTCHENS